United States Patent [19]

Srourian

[11] Patent Number: 5,550,179
[45] Date of Patent: Aug. 27, 1996

[54] WATER BASED LACQUER COMPOSITIONS AND METHOD OF MAKING AND USING SAME

[76] Inventor: Nichan Srourian, 3009 Dona Emilia Dr., Studio City, Calif. 91604

[21] Appl. No.: 49,008

[22] Filed: Apr. 19, 1993

Related U.S. Application Data

[63] Continuation of Ser. No. 659,731, Feb. 25, 1991, abandoned.

[51] Int. Cl.$^6$ .............................. C08K 5/20; C08K 5/10; C08K 5/07
[52] U.S. Cl. ........................ 524/210; 524/284; 524/356
[58] Field of Search .................................. 524/210, 104, 524/356, 284; 428/423.1

[56] References Cited

U.S. PATENT DOCUMENTS

| | | | |
|---|---|---|---|
| 4,363,893 | 12/1982 | Hersh | 524/376 |
| 4,719,132 | 1/1988 | Porter Jr. | 427/409 |

Primary Examiner—Joseph L. Schofer
Assistant Examiner—Wu C. Cheng
Attorney, Agent, or Firm—Robert J. Schaap

[57] ABSTRACT

A water based transparent or translucent lacquer composition for application to plastic items and which provides good adhesion. The lacquer composition comprises a film-forming polymer dispersion along with a water miscible organic solvent, such as an alcohol, present in an amount which does not exceed thirty percent by weight. A substantial portion of the composition e.g. at least 30% is comprised of water. A pigment or dye is incorporated in the composition to provide a color hue or tone to the composition but where the composition still remains transparent or translucent. The composition may also include a coalescing agent, such as an ester alcohol, to provide the needed film resiliency and elongation and to lower film forming temperature. The composition may also optionally include a surfactant. In addition, the composition may optionally include a wetting agent and a thickener and plasticizer. The composition provides aesthetic qualities to the plastic part as well as scratch and abrasion resistance with good adherence to the part. A method of using the composition is disclosed. Further, a method of making the composition which is comprised of forming a polymer dispersion mixture and a solvent mixture are then mixed together vigorously to provide the final lacquer composition.

24 Claims, 2 Drawing Sheets

WATER BASED LACQUER COMPOSITIONS AND METHOD OF MAKING AND USING SAME

RELATED APPLICATION

This application is a continuation of my patent application Ser. No. 659,731, filed Feb. 25, 1991 now abandoned for "Water Based Lacquer Composition and Method of Making and Using Same."

BACKGROUND OF THE INVENTION

1. Field of the Invention

This invention relates in general to certain new and useful improvements in a lacquer composition for application to plastic articles, and more particularly, to a water based lacquer composition which provides good adherence and excellent scratch and abrasion resistance, as well as methods of making and using the composition.

2. Brief Description of the Prior Art

Many plastic parts and articles are commonly fabricated from acrylics and polyurethane due to the ease of molding or other forming and the low cost involved. In many cases where these parts or articles are primarily visually apparent to the public or in cases where aesthetic appearance is an important factor, it may be necessary to apply a dye or varnish to the exterior surface thereof. The dye or varnish also provides an important contribution in that it provides surface protection and protects the part from abrasions or scratches.

Molded plastic components of this type are widely used in a large number of industries and including, for example, the shoe industry. In this case, a shoe sole or for that matter a shoe upper may be molded from an acrylic or a polyurethane. The color of the article thus produced in the molding operation may be approximately that which is desired. However, it may be important to provide a different hue or tone to the color, in which case a dye or varnish must be applied. Further, where there is a slight surface texture to the article, it is important to apply a dye or varnish which will adhere well but will not. otherwise obliterate the surface texture.

There are numerous dyes or varnishes, often referred to as lacquers, which can be applied to the plastic articles usually by dipping, spraying or hand painting. However, in essentially all case, the dyes are organic solvent based, that is, the lacquers contain an organic solvent as a carrier. A dye or pigment included in the composition is applied to the surface of the plastic item when the solvent dried. When the plastic is not yet completely hardened, the dye or pigment becomes effectively integral with the surface of the plastic item.

In recent years, there has been an increased emphasis on environmental pollution and a strong governmental resistance to products which are hazardous to worker's health from a standpoint of pollution or which are hazardous as a result of potential fire. Most of the organic solvents employed in present day lacquers usually have a low ignition temperature and hence they are dangerous as a result of their potential to start fires. Furthermore, and in recent years, there has been increased findings of health problems associated with many of the commercial organic solvents which were at one time thought to be relatively harmless.

In view of these problems, there have been recently enacted governmental restrictions on the use of the commercial solvents such as those solvents normally used as a carrier for the lacquer compositions. These restrictions result in the necessity for spray booths, special restrictions on the amount of solvents which can be used and like factors. As a result, they substantially add increased costs to the production of the part or article.

There has been a long felt need, and which has become particularly pronounced in recent years for a water base liquid carrier used in lacquer compositions to avoid the problems associated with the organic solvent based lacquer compositions. One of the main problems which have been encountered in attempts to use a water based lacquer is the fact that there is little adhesion to the plastic parts. Previous attempts to employ a water based lacquer resulted in low adhesion and in addition, these lacquers did not provide the strength and surface resistance necessary to avoid abrasions and scratches.

OBJECTS OF THE INVENTION

It is, therefore, one of the primary objects of the present invention to provide a lacquer composition for application to plastic parts and components which utilizes a water base as opposed to an organic solvent base.

It is another object of the present invention to provide a lacquer composition of the type stated which provides good adhesion to plastic parts and which provides a surface resistance to scratches and abrasions, even though formulated with a water base.

It is a further object of the present invention to provide a water based transparent or translucent lacquer composition of the type stated which includes a pigment or dye which remains on the plastic article after a liquid carrier has dried and provides an excellent surface coating.

It is an additional object of the present invention to provide a water based lacquer composition of the type stated which is relatively safe to use and can be produced at a relatively low cost.

It is another salient object of the present invention to provide a method of applying a pigment or dye to a plastic item with good surface adhesion and providing scratch and abrasion resistance, as well as aesthetic qualities, by using a water based lacquer composition of the type stated.

It is still a further object of the present invention to provide a method making a water based translucent or transparent lacquer composition for application to plastic items and which can be made relatively efficiently and at a low cost.

With the above and other objects in view, my invention resides in the novel features of form, such compositions and components used in the formulation thereof and in the superior qualities and characteristics achieved thereby as well as a unique and novel method of use thereof and method of making same as presently described and pointed out in the claims.

BRIEF SUMMARY OF THE INVENTION

A water based lacquer composition which is used for the application to plastic items, including but not limited to shoe components. The lacquer composition is preferably transparent or translucent so that when applied to the surface of a plastic part, a surface contour of the molded plastic part will not be blocked or rendered unobservable. Moreover, the composition provides excellent adhesion and renders an excellent surface protective coating with goods scratch and abrasion resistance. Moreover, the coating also provides an aesthetic quality to the plastic item.

In a broad aspect, the water based transparent or translucent lacquer composition comprises an aqueous film-forming polymer dispersion in which the polymer of the dispersion is dried on the plastic item by evaporation of a carrier as opposed to polymerization. The polymer dispersion is preferably formed of a non-cellulosic resin and is non-flammable. The acrylate and polyurethane polymers are preferred although many natural and synthetic latex rubbers can be used, as hereafter described.

The water based lacquer composition also comprises a water miscible organic solvent which is selected from the class consisting of amides and ketones. The organic solvent is present in an amount which is sufficient to enable good adhesion of the polymer to a plastic item. However, the organic solvent must be present in a relatively minor amount so that there are little or no health hazards associated with the composition and so that the water constitutes the dominant carrier. In all cases, the solvent does not exceed thirty percent by weight of the composition based on the total weight of the composition and usually is present in lesser amounts. Water will always be present in an amount of at least thirty percent based on the total weight of the composition and usually in a much high percentage.

The translucent or transparent lacquer composition also comprises a pigment or a dye which is incorporated in the composition to provide a color hue or tone to the composition. Thus, when the composition is applied to a plastic item, a color hue or tone is imparted to the item. However, this color is one which only changes a hue or tone and is not typically designed to create a gross color change. Dyes or pigments could be incorporated to completely change the color of the plastic part or item if desired. However, the composition usually remains transparent or translucent.

The film-forming polymer and the water miscible organic solvent as well as the pigments or dyes are the three major components of the composition along with water. This composition, as indicated, provides excellent surface adherence when the carrier, which constitutes the solvent and the water evaporates. Consequently, no polymerization is required.

The composition may also contain other components such as a coalescing agent to provide a desired amount of flexibility or elongation to the film resulting from evaporation of the solvent of the composition. The composition may also comprise a surfactant to reduce foaming, a plasticizer to obtain a desired degree of softness and elongation and a wetting agent to provide an emulsification to the composition. The wetting agent should preferably be a non-ionic wetting agent. Further, the composition may comprise a non-metallic hydrated thickening agent to provide a desired viscosity.

In a more preferred aspect of the invention, the polymer is selected from the class consisting of acrylates, polyurethanes and non-vulcanzable latex resins. The coalescing agent, when employed, should be an ester alcohol. In addition, the thickening agent or thickener should be silicone, acrylic or polyurethane based.

The present invention also provides a method of applying a pigment or dye to a plastic item with good surface adhesion to the item and provides a scratch and abrasion resistance as well as aesthetic qualities to the plastic item. The method comprises the application of the water based transparent or translucent composition heretofore described. Thus, the present invention provides a method of producing a plastic article which has not heretofore been available.

The present invention further provides a method of making a water based transparent or translucent lacquer composition for application to plastic items. In this case, the method comprises the contacting of a pigment or a dye with a water miscible solvent selected from the class consisting of amides and ketones in an amount to provide good adhesion to a plastic item. This combination of the pigment and dye along with the solvent is then mixed with water in an amount so that the organic solvent is present at no greater than thirty percent by weight based on the total weight of the composition to provide this first mixture. An aqueous film-forming polymer dispersion is then mixed with water in an amount so that the total weight of the organic solvent in the composition is no greater than thirty percent by weight based on the total weight of the composition as aforesaid. This second mixture is then mixed with the first mixture by vigorous mixing until a completely homogeneous final lacquer composition has been achieved.

This invention possesses many other advantages and has other purposes which may be made more clearly apparent from a consideration of the forms in which it may be embodied. These forms are set forth in the following detailed description. However, it is to be understood that the detailed description is only for purposes of illustrating the general principles of the present invention and that such detail description is not to be taken in a limiting sense.

BRIEF DESCRIPTION OF THE DRAWINGS

Having thus described the invention in general terms, reference will now be made to the accompanying drawing (two sheets) in which:

DETAIL DESCRIPTION OF A PRACTICAL EMBODIMENT

The present invention relates specifically to an aqueous lacquer composition which can be applied to plastic items, as aforesaid. One of the major components used in the lacquer composition is a polymer, preferably in the form of a polymer dispersion. Specifically, this polymer dispersion comprises a water soluble polymer (as hereinafter described) which is mixed in an aqueous base and particularly water or a water base. The water is usually present in the dispersion itself in an amount of about twenty to fifty percent by weight.

The polymer is effectively the film-forming medium and heretofore was carried by an organic solvent, such as the lower molecular weight alcohols, in the prior art lacquer compositions. However, in accordance with the present invention, while some organic solvent may be employed in the present compositions, the solvent is present in relatively minor amounts compared to the water.

The preferred polymers are the acrylic polymers and polyurethanes. Several latex polymers may also be used, as hereinafter described. The resin must be a non-cellulosic resin and must also be water miscible and non-flammable. At least, the solvent content must be sufficiently low so that there is no ignition temperature in normal work environments in which the lacquer composition may be used.

The polymer and the water in the separate polymer-water dispersion, may constitute up to 70% of the total weight of the lacquer composition with the other components primarily making up the balance of the weight of the composition. In all cases, water makes up a substantial portion of weight of the dispersion. The polymer of the dispersion not including the weight of water in the dispersion, may be present in the total lacquer composition in an amount of about 1% to about 45%. Therefore, unless otherwise specified the amount of polymer will refer to the weight of the polymer in the dispersion and not including the water in the dispersion.

While 1% percent of polymer may be used in the composition, it is usually not sufficient for many applications and a minimum of 10% of the polymer should be employed. Thus, the polymer may be used (excluding the water in the dispersion) in a range of about one to forty-five percent by weight based on the total weight of the composition. Preferably, however, the polymer should be present in an amount of about eighteen percent to about twenty percent by weight based on the total weight of the composition.

Several acrylates and methacrylate polymers may be used in the polymer dispersion and include methyl acrylate, ethyl acrylate, methyl methacrylate and ethyl methacrylate. While the acrylate polymers are probably the most effective, polyurethanes are frequently employed. Polyvinyl acetate also has been used and provides excellent abrasion resistance.

Several latex polymers are also usable in the present invention. Those latex rubbers which do not require vulcanization may be employed in the present invention. These include natural rubber latex, synthetic latex materials, polystyrene, neoprene, etc.

One of the preferred methacrylate polymer dispersions which can be used in the present invention is that dispersion offered by BASF Corporation under the trademark "Luhydran". The methacrylate resins, such as those offered under the trademark Luhydran, are effective binders and will effectively and tightly bind to a surface of a plastic part or item regardless of the shape or surface configuration. Furthermore, these methacrylate resins usually result in compositions of substantial hardness and surface resistance. Moreover, it is preferable to avoid use of methacrylate resins which avoid cross-linking agents.

Some of the other aqueous polymer dispersions which may be used include those polymethylmethacrylates, either as a homopolymer or copolymer, offered by BASF Corporation under the name "Acronal". A polyether or polyester polyurethane dispersion of the type offered under the name "Baybond" by Bayer can also be employed. Further a polyvinyl acetate offered under the mark "Butvar" by the Monsanto Company can be used. A vinyl acetate-ethylene copolymer offered under the name "Aircoflex 100 HS" by Air Reduction Company may also be employed.

The organic solvent which is used is preferably selected from the class consisting of amides and ketones. In any case, the organic solvent must be water miscible and in the composition, it must have a very high flash point. The solvent must be used in an amount so that there is little or no flammability, as aforesaid, but also in an amount sufficient so as to provide strong surface adhesion with a plastic part and particularly a plastic item formed from acrylates and/or urethane.

One of the preferred organic solvents which may be used is a butylacetate solvent and particularly a butylcellusol acetate. This solvent provides excellent adhesion when an acrylic butadiene styrene polymer is used. Another highly effective solvent which may be used is dimethylformamide and specifically N,N-dimethylformamide. Again, because of the hazardous nature of dimethylformamide, relatively minor amounts are used compared to the amount of water in the total composition. Dimethylformamide has a specific gravity similar to that of water, namely 0.95 and has a 100% solubility in water. In addition, it is colorless and thereby enables the formation of a transparent or translucent composition.

When the polymer dispersion employed is a polyurethane, dimethylformamide and methylpyrolidone are the preferred solvents and in fact, constitute some of the most effective solvents.

Some of the other organic solvents which may be used are methylethyl ketone, methylisolbutyl ketone, acetone, cyclohexadine, cyclohexanone and tetrahydrofuran and combinations of the foregoing.

The solvents preferably should be in the range of about 5% to about 20% by weight based on the total weight of the composition and ideal weight percentage is about 15% to about 16% by weight, based on the total weight of the composition. However, the solvent can be used in a range of about 1% to 30% by weight based on the total weight of the composition. In all cases, the amount of organic solvent should not exceed 30% by weight. Preferably, the amount of the organic solvent should not exceed 25% by weight, based on the total weight of the composition.

Any of a number of known pigments or dyes may be used in the lacquer composition of the present invention. In fact, many of those pigments and dyes which are used in conventional lacquer compositions can be employed in the compositions of the invention. Depending upon the color or tone which is to be imparted to the lacquer composition, the amount and type of dye or pigment will vary. In all cases, acid pigments cannot be used. The pigments must be either neutral or of alkaline pH. Moreover, both organic and inorganic pigments may be employed.

Preferably, although not necessarily, the pigment or polymer dispersion, or both, should have a fairly high viscosity so as to form a paste-like composition when blended together. In many cases, the pigment may dispersed in a plasticizer before addition to the polymer in order to form a paste. In all cases, when a dye is used, it must be transparent or translucent.

Many of the effective pigments are azo pigments which are capable of dissolving in the composition of the invention. However, it is not necessary for the pigment or dye to be completely soluble in the composition. The pigment or dye may form a dispersion with the composition and which will still nevertheless remain tightly adherent to a plastic part or item when the carrier, such as the organic solvent and the water, has evaporated. Nevertheless, the pigment will be blended with the polymer.

The dyes which may be used are preferably alcohol solvent dyes and those dyes which may soluble at least with the organic solvent of the present invention. The water soluble dyes are easily used with the water based compositions. Azo dyes are also highly effective. Some of the azo dyes which may be used are anthraquinone which is solvent Violet 11, Yellow 43 or quinoline, Orange 5 namely a mono azo, or a di-azo, etc. Many analine dyes may be present.

Other dyes which can be employed include chromium oxide, various cadmium colors, titanium dioxide, antimony trioxide, various molybdenum colors, strontium colors, dioxazine colors, nickel azo colors, etc.

The polymer and organic solvent, to the extent present, and dye or pigment and water are essential components in the composition of the present invention. Water typically makes up the balance of the composition by weight. The amount of the water will vary substantial, although in all cases, water will be present in a minimum amount of 30% by weight and usually 50% by weight or higher.

Various optional, but desirable components may also be used in a composition of the present invention. The composition usually includes a surfactant and preferably an aqueous surfactant emulsion. The surfactants are usually silicone based surfactants. The surfactant is preferably used in an amount of about 0.3% to about 3% when employed. However, it preferably would range from about 0.5% to about 1%.

One of the preferred surfactants which may be used in the present invention to provide anti-foaming qualities are the silicone anti-foamants, such as the aqueous anti-foam polydimethylsiloxane emulsions offered by the General Electric Company known as AF 60, AF 72, AF 93 and AF 9020. These compositions usually contain a silicone volume of at least about 30% and a viscosity of at least 1000 centipoises. They may also be used with a non-ionic emulsifier. Another low solid emulsion which can be used is that offered by Rohm and Haas Company under the name Acrysol ASE-108. Other surfactants which may be used are sodium lauryl ether sulfate a BASF surfactant known as LR 8807, and the surfactant "Triton" by Rohm and Haas.

The present invention preferably includes a relatively small amount of a coalescing agent. The coalescing agent provides for film elongation. The coalescing agent is highly desirable since the film which is formed on the plastic component may break in its absence. Some of the suitable coalescing agents are the ester alcohols. Trimethyl monoisobutyrate, ethylene glycol, propylene glycol, butoxyethanol, diethylene, glycol monobutyl ether, etc. may be employed.

One suitable coalescing agent which has been found to be highly effective is a propylene glycol monobutyl ether offered under the name "Proposalp" by Eastman Chemical. Another highly effective coalescing agent used in accordance with the present invention is an ester-alcohol offered by Eastman Chemical Products under the name "Texanol" which is primarily 2,2,4- Trimethyl-1,3-Pentanediol Monoisobutyrate. This ester alcohol is highly effective in that it is relatively non-hazardous in industrial and commercial handling. Further, it does not provide substantial skin irritation or eye irritation. However, other coalescing agents may be employed as indicated above.

The amount of coalescing agent which is used will range from about 2% to about 15% by weight, based on the total weight of the composition. However, the coalescing agent is preferably used in a range of about 8% to about 10% by weight, based on the total weight of the composition. The amount of coalescing agent employed will depend upon the desired hardness in the formed film. Moreover, to some extent, it will depend upon the film-forming temperature.

A plasticizer can also be used in the lacquer composition of the invention. The plasticizer is also employed depending upon the desired hardness of the composition. The phthalates are the preferred plasticizers which may be used. One of the preferred plasticizers is dibutyl phthalate. The choice of the plasticizer will depend to a large extent on the resin which is employed. When urethane is employed as the resin, phthalates are almost always used as a plasticizer. Ethylene glycol may also be used as a plasticizer with acrylic resins.

Some of the effective plasticizers which can be used are tricresol phosphate, tributyl phosphate, and creosol diphenyl phosphate which are all phosphates plasticizers. The phthalate plasticizers which can be used are dioctyl phthalate, di-iso octyl phthalate, butyl/benzoyl phthalate and didecyl phthalate. One of the preferred plasticizers is dibutyl phthalate. Some of the adiapate plasticizers include dioxtyl adiapate and didecyl adiapate. One highly effective plasticizer which may be used is a dibutyl phthalate ester offered under the name "Palatinol C" by BASF Corporation.

The amount of plasticizer which is used is essentially 2% to about 15% by weight, based on the total weight of the composition. However, and again, similar to coalescing agents, the amount of the plasticizer will preferably range from between about 8% to about 10% by weight, based on the total weight of the composition.

The composition of the invention may also use a wetting agent, if required. The wetting agent performs the well known function of reducing the surface tension. This will enable easier and better coverage of the lacquer composition on a plastic item. The wetting agent is preferably a non-ionic, neutral surface active agent. Many well known emulsifiers can also be used as a wetting agent. Thus, sodium laureate, etc. may be employed. Other wetting agents include sodium lauryl ether sulfate and even that surfactant LR 8807 by BASF which functions as a wetting agent.

The amount of the wetting agent which can be used again ranges from about 0.2% to about 15% by weight, with preferred range being 1% to 2% by weight, based on the total weight of the composition. The amount of the wetting agent could actually be somewhat lower and for that matter even somewhat higher than the range specified, if desired. As indicated, the amount of the wetting agent will depend upon the desired surface tension in the final lacquer composition.

As indicated previously, a thickener may also be employed in the lacquer composition, although it is not absolutely required. The thickening agents are preferably hydrated silica and even more preferably hydrated amorphous silica. Non-metallic oxides such as silicone dioxide are also effective as thickening agents. The thickening agents are generally all silicone based and are all finally dispersed. Two well known thickening agents which may be used are those offered under the trademarks "Methocel" and "Hycel".

One of the preferred groups of thickening agents which may be used are vinyl pyrrolidone copolymers. These copolymers are effective since they operates as a protective colloid in the formation of the resin dispersion. Furthermore, they do provide relatively good flow property. Another one of the preferred thickening agents which may be used is that offered by BASF Corporation of Parsippany, N.J. under the trademark "Collaclar VL". In like manner, a thickening agent offered by BASF Corporation under the name "Latekoll D" is also an effective thickening agent.

The thickening agents when employed, are used in a range of about 1% by weight to about 5% by weight, based on the total weight of the composition. However, the thickening agent preferably is used in an amount of about 3% to about 4% by weight, based on the total weight of the composition.

Figure 1:
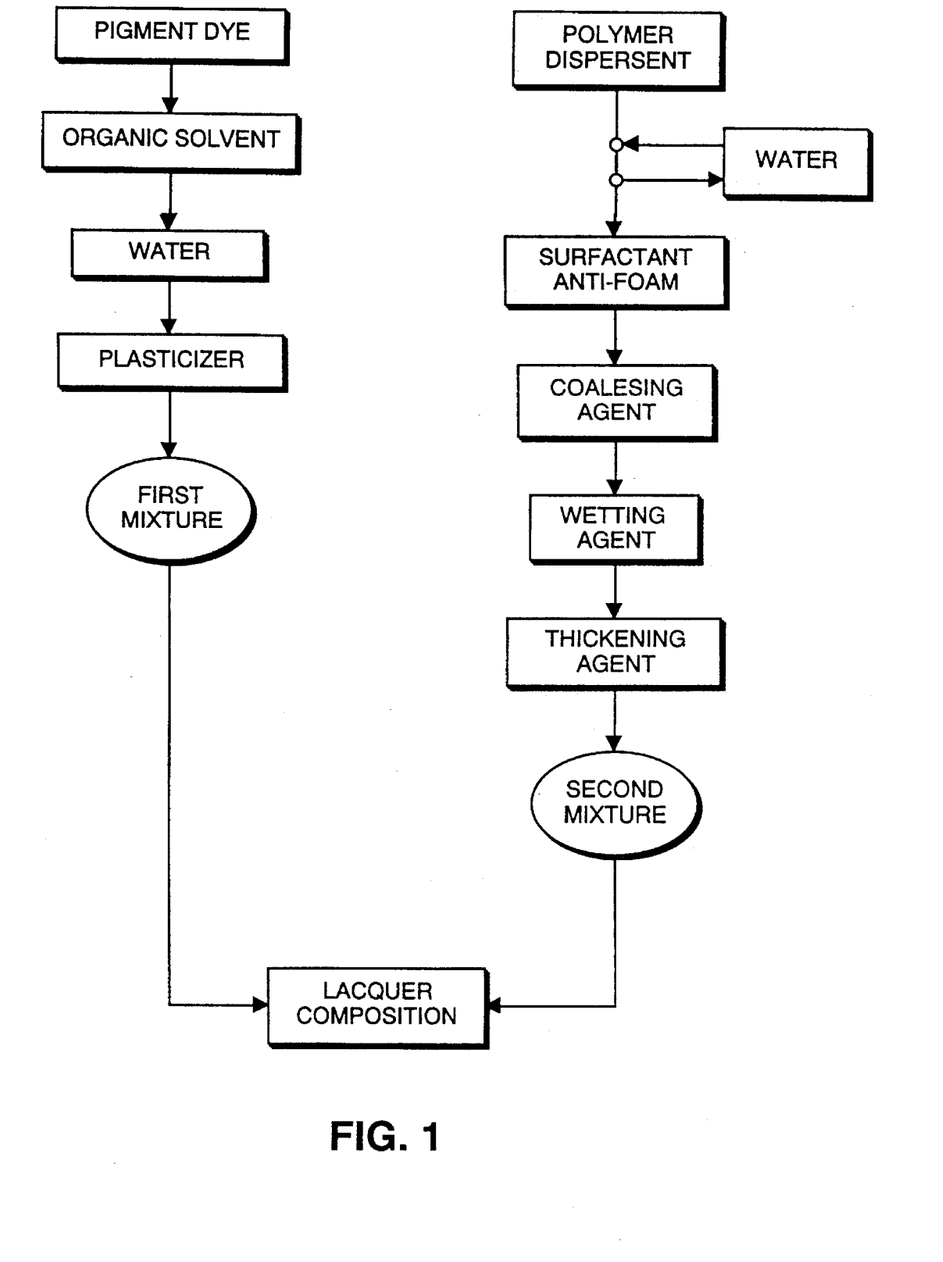
FIG. 1 shows a block diagram of the components of a preferred embodiment of the composition and a preferred method of making the composition.

The method of making the composition of the invention is very schematically illustrated in the figure forming part of this application. It can be observed that two different mixtures are first formed and which mixtures are then added together in order to form the final lacquer composition. In the figure, the optionally includable components are shown and identified along with those which are necessary in the lacquer composition. Furthermore, each of the components are shown as being successively added to one another in the box-like representation. However, it is to be understood that these components are not added to each other in a step wise progression in the manner as illustrated. The components could be added together simultaneously or individually at separate times during the formation of the composition.

The composition is formed by producing a first mixture comprised of the pigment or dye and the organic solvent. The solvent and die may also be mixed with a desired amount of water. However, water will be included in the second mixture as hereinafter described. The plasticizer is also included along with the solvent and the die in order to form this first mixture, when the plasticizer is included in the composition.

If a die is used as opposed to a pigment, it should be slowly added to the solvent water mixture in order to avoid a flocculation. Further, the dyes are added slowly along with a mild mixing. It can be observed that the organic solvent and water, as well as the plasticizer, when employed form a first mixture.

A second mixture comprised of the polymer dispersion is also formed. The second mixture includes the water as well as well as some of the other components of the composition if employed. Thus, by reference to the figure, it can be observed that surfactant, coalescing agent, wetting agent and thickener are all mixed in order to form the second mixture. The thickening agent is usually added last to the second mixture in order to adjust the viscosity of the final varnish for either dipping or spraying purposes.

In formation of the second mixture, there is usually not a batch addition of components. The coalescing agent, for example, is added slowly to the mixture over a period of about 15 to 30 minutes with high speed mixing. In like manner, when a dye is employed, in the first mixture, it is also added to organic solvent over a period of about 30 minutes with vigorous mixing.

Thereafter, the two mixtures are mixed together vigorously with a high speed agitator. To aid in obtaining a complete homogeneous blend of the two mixtures, warmer temperatures could be employed and this is particularly true when the plasticizer is added to the organic solvent. However, when the polymer containing second mixture is added to the first mixture, the temperature should be at about room temperature. Mixing of the components in the first mixture usually takes place for about one to five minutes.

After the two mixtures have been combined and blended as indicated, they are preferably filtered since there will be some coagulation components to be removed. The filter selected is sufficiently large to allow the pigment particles and like particles forming part of the composition to pass through the filter. However, it must be sized so as to pick up these other coagulation components. The actual size of the filter will depend upon the system used including the size of the pump and the like. However, paper filters with gravity flow are usually effective.

Figure 2:
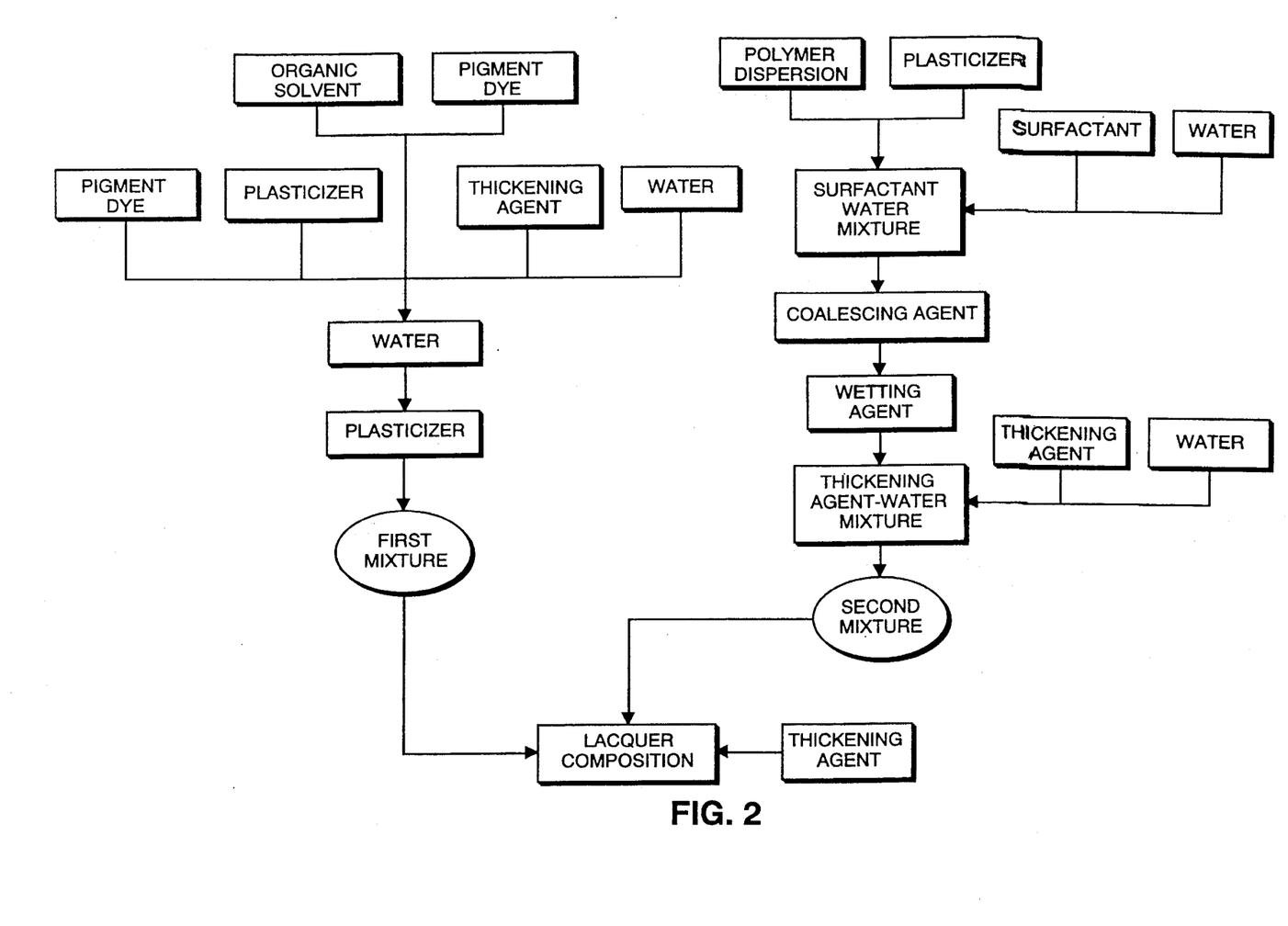
FIG. 2 shows a block diagram of an alternate method of making the composition.

FIG. 2 illustrates a modified form of making the polymer composition of the present invention. In this case, several sub-mixtures are formed in the manner as shown in FIG. 2. Thus, it can be observed, in this case, that the plasticizer is initially mixed with the pigment or the dye to form a first sub-mixture. The organic solvent is also mixed with a portion of the pigment or the dye to form a second sub-mixture. Finally, water is mixed with a thickening agent in order to form a third sub-mixture. These three sub-mixtures are then added to a substantial amount of water. Thereafter, a plasticizer may be added to the water if required and this thereby forms the first mixture.

The second mixture is also initially comprised of two sub-mixtures. In this case, the polymer dispersion is mixed with a plasticizer to form a first sub-mixture. The water is mixed with a surfactant to form a second sub-mixture. These two sub-mixtures are then mixed together and mixed with a coalescing agent and a wetting agent. The thickening agent is mixed with water before being mixed with the other components forming part of the second mixture in the manner as shown in FIG. 2.

At this point in time, the first and second mixtures are thereupon mixed together and blended. The composition thus formed will also be filtered as described in connection with the first embodiment of making the composition. However, in the case of this latter method of making the composition, additional thickening agent may be added to the final lacquer composition, if required.

The lacquer composition of the invention is usually stable for a period of about six months. However, after that, it has been found that the dispersion begins to break down. Where desired, the composition may also be thinned with water.

The composition of the invention is highly effective for use on shoe components, as indicated above. It is also effective for application to automotive vehicle parts inasmuch as many of these parts are presently being made of urethane. They are also effective for application to plastics used in the form of artificial leathers for purposes of providing colors or hues and surface protection to these artificial leathers. As indicated, the coating provides a scratch and abrasion resistant finish and will thereby improve the life of the plastic article.

One of the important aspects of the invention is that while the lacquer composition is water based, it nevertheless has excellent adhesion with the plastic article. Furthermore the composition can be translucent or transparent. In order to demonstrate the excellent surface adhesion, a relatively simple peel test can be employed. The conventional peel test involves the stripping of a flexible member which has been bonded with an adhesive to another member and consists of pulling the flexible member at an angle of 90 degrees to 180 degrees so as to induce peeling. Again, depending upon the type of flexible member employed, failure will occur in the flexible member when the peel adhesion reaches a predetermined level. Thus, if a flexible member is employed using the composition of the present invention and a prior art composition, the adhesion of the present composition is as good as the prior art composition if the flexible member requires the same pull force to cause shear. Typically, measurement can be made in pounds per square inch of width when a peel specimen is under test.

For purposes of measuring adhesion in the present invention, the T-peel test as defined in ASTM method D-1876 may be employed. This test is normally used to determine the relative peel resistance of an adhesion bond between two flexible adherents. In like manner, an impact test for determining the durability and resistance provided by the coating of the present invention may also be made in accordance with the impact strength test described in ASTM method D-950. However, and as indicated, the surface adhesion is found to be as good as with generally most of the 100% organic solvent base lacquer compositions.

Various peel tests are well known in the art and not described in detail herein. In this case, when the compositions of the present invention are tested against prior art compositions using a 100% solvent base system, it is found that these compositions exhibit adhesion as good as any of the solvent based compositions. Absolute data testing is not required since it is important only to achieve an adhesion equivalent to the organic solvent based system. The compositions of the present invention achieve that degree of adhesion.

EXAMPLES

The invention is further illustrated by, but not limited to, the following examples.

Example 1

Approximately 4 pounds of an aqueous polymer dispersion offered by BASF Corporation under the name Luhydran, and which is a polymethylmethracrylate, as a basic film forming agent, was mixed with approximately 0.4 pounds of a diebutyl phthalate plasticizer. Mixing occurred with slow agitation for about five minutes. 2.0 pounds of water was then added to this mixture and mixing continued for about another three minutes.

0.05 pounds of an anti-foaming agent offered by General Electric under the name "AF 60" was then dissolved in 0.2 pounds of water and this anti-foaming agent and water was then added to the aforesaid mixture. Thereafter 0.4 pounds of a coalescing agent known as Texanol by the Eastman Chemical Corporation of Rochester N.Y. was added to the mixture and mixed for about another ten minutes and this formed the first mixture of a lacquer composition.

A second mixture was formed by dissolving 0.1 pound of a dye offered by Specialty Coating under the name SA34 in 0.8 pounds of dimethyl formamide. Prior to the dissolving of the dye, the dimethyl formamide was heated to about 150 degrees F. in order to speed up the dissolving of the dye. The dye was mixed with the dimethyl formamide for about ten minutes. Thereafter, 0.05 pounds of a thickener known as "Collaclar PU 85" formerly dissolved and 0.1 pound of water was added with mixing vigorously to this second mixture for about 5 minutes. The mixture was then allowed to cool to room temperature. Two more pounds of water was then added to the second mixture and mixed therein.

Both of the first and second mixtures were thoroughly mixed for about 30 minutes with the second mixture being slowly added to the first mixture. However, vigorous mixing was required in order to mix both of the mixtures.

Example 2

A test specimen was prepared by applying the lacquer composition formed in Example 1 on clean urethane molded plates. The lacquer coated plates were allowed to dry at room temperature and at 50% relative humidity for a period of 24 hours. It was determined that this was sufficient time for the slow evaporating solvents such as dimethyl formamide to be absorbed through the polyurethane skin and evaporate into the air. It was also determined that the lacquer was actually dried sufficiently for purposes of handling within about one hour since a polymer film actually formed on the surface of the coated plates by the initial evaporation of the water.

A test revealed that the lacquer composition formed in accordance with Example 1 had a degree of adhesion which was at least as strong as that obtained when using a 100% organic solvent based lacquer composition for the same purpose.

Example 3

The process of Example 1 is repeated to make another lacquer composition. In this case, a polydimethylsiloxane emulsion offered by General Electric under the tradename AF 9020 is used as an anti-foaming agent. Approximately 0.07 pounds of this anti-foaming agent is dissolved in about 0.2 pounds of water.

In place of dimethyl formamide as the organic solvent, methyl pyrrolidone is employed in approximately the same amount. However, about 0.3 pounds of anthraquinone dye (Violet No. 11) is employed in place of the SA 34 dye. Finally, a vinyl pyrrolidone copolymer offered by BASF Corporation under the trademark "Latekolld" is used as a thickener in place of the Collaclar PU 85.

The composition is found to be as effective as the lacquer composition of Example 1 when tested in accordance with the procedures of Example 2.

Example 4

Approximately 3 pounds of a polyvinyl acetate polymer dispersion which is used as the basic film-forming agent is mixed with approximately 0.3 pounds of a plasticizer of a tributyl phosphate plasticizer. Mixing occurs with slow agitation for about ten minutes. Thereafter, about 1.5 pounds of water is added and mixing again continues for about another five minutes. 0.02 pounds of an acrysol "Ase-108" anti-foaming agent is dissolved in about 2.0 pounds of water and is thereafter added to the previously formed mixture.

Approximately 0.3 pounds of butoxyethanol as a coalescing agent is then added to the mixture with mixing occurring for about ten minutes in order to form the first mixture of the lacquer composition.

A second mixture is formed by dissolving 0.15 pounds of a quinoline (Orange 5) pigment in about 0.6 pounds of a methyl ketone solvent. This solvent is previously heated to 165 degrees F. prior to mixing with the pigment in order to speed up the dissolving of the pigment therein. Mixing of the pigment and the solvent must occur for at least about ten minutes.

Thereafter, 0.73 pounds of a Methylcel thickener which is a hydrated amorphous silica is dissolved in about 0.2 pounds of water. This thickener with water is then added to the second mixture for about 5 minutes with vigorous mixing occurring. 2.0 pounds of water is then added and mixed. Finally, the mixture is allowed to cool to room temperature.

The first and second mixtures are then mixed thoroughly for about 30 minutes with vigorous mixing occurring. The second mixture is actually added slowly to the first mixture with vigorous mixing occurring. Thereafter, the lacquer composition is gravity filtered to form the final lacquer composition.

Example 5

The lacquer composition of Example 4 is tested by applying the composition to clean polyurethane molded plates and which are allowed to dry for about 24 hours at room temperature with 60% relative humidity. Here again, the time is sufficient to allow the slow evaporating solvents to be absorbed through the polyvinylacetate skin. Further, the lacquer plate is capable of being handled within about ½ hours of drying time.

The lacquer composition film is found to be as adherent as the film from the lacquer composition formed in accordance with Example 1.

Example 6

Approximately 5 pounds of a polyvinylpyrrolidone aqueous polymer dispersion which serves as a film forming agent is mixed with about 0.5 pounds of a dioctyl phthalate plasticizer. Mixing occurs with slow agitation for about five minutes. Thereafter, about 3 pounds of water is added and mixing continues for about another 5 minutes.

2, 2, 4-Trimethyl-1, 3-Pentanediol Monoisobutyrate as a coalescing agent is added to the previously formed mixture with mixing occurring for about 10 minutes. In addition, 0.6 pounds of the Acrysol "Asg-108" anti-foaming agent is also dissolved in about 0.4 pounds of water and added to the mixture. Mixing occurs for about another 15 minutes to form the first mixture of the lacquer composition.

A second mixture used in the composition is formed by dissolving 0.08 pounds of titanium dioxide dye in about 1 pound of methylethyl ketone solvent. This solvent is previously heated to about 135 degrees F. to speed up the dissolving time. The dye and the solvent must be mixed for at least about 15 minutes. 2.5 pounds of water is then mixed into the second mixture.

0.05 pounds of a hycel thickener, which is essentially a hydrated amorphous silica, is added to about 0.08 pounds of water with mixing occurring vigorously for about 5 minutes. The second mixture is thereupon set aside to cool to room temperature. Both of the first and second mixtures are thereafter thoroughly mixed together with the second mixture being slowly added to the first mixture. Vigorous mixing must occur in order to form the final lacquer composition. This composition is then filtered by a vacuum pump filter method.

Example 7

The lacquer composition of Example 6 was then applied to clean polyvinylacetate disks and allowed to dry for about 24 hours at a 60% relative humidity. Here again, the time is sufficient to allow the solvent to evaporate into the air through the formed skin. Testing reveals that the adhesion is as good as that achieved with the film from the lacquer composition of Examples 1 and 4.

Example 8

Approximately 6 pounds of a polymethylmethracryalate aqueous polymer dispersion offered by BASF Corporation under the name "Luhydran" is used as a basic film forming agent This film-forming agent is mixed with approximately 2 pounds of water approximately 4 pounds a propylene glycol monobutyl ether coalescing agent offered under the name "Proposalp" is added as a coalescing agent.

An ethyl alcohol agent wetting agent is also added to the mixture in an amount of about 0.3 pounds in order to avoid flocculation. In many cases, the wetting agent is added prior to the addition of water in order to avoid further flocculation of any solvent. An amide thickening agent, such as dimethyl formamide is then added in an amount of 0.55 pounds by weight. The components forming part of this mixture are thoroughly mixed for a period of about 15 minutes at room temperature.

A second mixture is formed and is comprised of an analine alcohol solvent dye in an amount of 0.3 pounds. The pigment is highly dispersed before adding to an organic solvent. The solvent employed is ethanol in an amount of 1.3 pounds by weight. Water in an amount of 3 pounds is also added to the second mixture.

Vinyl pyrrolidone is added as a thickener to the mixture containing the polymer emulsion in an amount of 0.07 pounds. A sodium lauryl ether sulfate of the type offered by Rohm & Haas Company under the trademark Triton is also added to the polymer containing mixture.

The two mixtures are thereafter thoroughly mixed for about 30 minutes with the first mixture being slowly added to the second mixture with vigorous mixing. The combined mixture is then filtered.

Example 9

The composition of Example 8 is then tested. Adhesion tests reveal that the lacquer composition thus formed in accordance with the previous Example 8 has a degree of adhesion at least as strong as that as which is obtained with a conventional 100% organic solvent based lacquer composition used for the same purpose. A T-peel test conducted in accordance with ASTM method D-1876 reveals that the adhesion strength is approximately equal. Further, an impact test conducted in accordance with ASTM method D-950 reveals that the lacquer composition of the invention provides hardness at least as great as that of the aforesaid conventional lacquer composition.

Thus, there has been illustrated and described a unique and novel water based lacquer composition which may be transparent or translucent and which is effective for application to plastic surfaces with excellent adhesion. A method of using this composition and a method of making this composition have also been disclosed. Thus, the present invention fulfills all of the objects and advantages which have been sought. It should be understood that many changes, modifications, variations and other uses and applications will become apparent to those skilled in the art after considering this specification and the accompanying drawing. Therefore, any and all such changes, modifications, variations and other uses and applications which do not depart from the spirit and scope of the invention are deemed to be covered by the invention.

Having thus described the invention, what I desire to claim and secure by Letters Patent is:

1. A water-based transparent or translucent, relatively permanent film-forming lacquer composition for application to unfinished plastic items with good adhesion, and which is environmentally safe and presents little or no health risks, and which items have been formed in plastic forming operations and which have not had any surface treatment finish thereon, said lacquer composition comprising:

a) a fully reacted aqueous film-forming polymer dispersion in which the polymer of the dispersion dries on the plastic item by evaporation of a carrier as opposed to polymerization, b) a water-miscible solvent selected from the class consisting of amides and ketones and pyrrolidones in an amount sufficient to dissolve a surface portion of the plastic item without creating any chemical reaction with the plastic item and thereby cause a physical bonding of the polymer dispersion and the plastic item to thereby enable good adhesion of the polymer dispersion to the plastic item, said solvent being present in an amount no greater than 30% by weight based on the total weight of the lacquer composition, c) water present in an amount of at least 30% based on the total weight of the composition, and d) pigment or dye incorporated in said lacquer composition which provides a permanent color to the composition but where the composition can remain transparent or translucent, and which lacquer compensation provides good adherence to a plastic item with good scratch and abrasive adherence and provides an aesthetic quality to the plastic item, and where the composition, when hardened forms a film on the plastic item with adhesion substantially as good as the adhesion obtained with a lacquer composition having substantially an organic solvent as the solvent for the dispersion and pigment or dye, so that the color imparted to the plastic item is permanent.

2. The water based lacquer composition of claim 1 further characterized in that the composition comprises a coalescing agent to provide a desired amount of flexibility and elongation to a film resulting from the evaporation of the solvent carrier of the composition.

3. The water based lacquer composition of claim 1 further characterized in that the composition comprises a surfactant present in an amount to reduce foaming.

4. The water-based lacquer composition of claim 1 further characterized in that the composition comprises a plasticizer present in an amount to obtain a desired degree of softness.

5. The water based lacquer composition of claim 1 further characterized in that the composition comprises a non-ionic neutral wetting agent to provide an emulsification to the composition.

6. The water based lacquer composition of claim 1 further characterized in that the composition comprises a non-metallic hydrated thickening agent to provide a desired viscosity to the composition.

7. The water based lacquer composition of claim 1 further characterized in that the polymer dispersion is a non-cellulosic polymer dispersion.

8. The water based lacquer composition of claim 1 further characterized in that the polymer is selected from the class consisting of acrylates, polyurethanes, and non-vulcanizable latex resins.

9. The water based lacquer composition of claim 1 further characterized in that the composition comprises an ester alcohol coalescing agent to provide a desired amount of flexibility and elongation to a film resulting from the evaporation of the solvent of the composition.

10. The water based lacquer composition of claim 1 further characterized in that the composition comprises a hydrated non-metallic silicon based finely dispersed thickening agent to provide a desired viscosity to the composition.

11. The water-based lacquer composition of claim 1 further characterized in that the composition comprises:
   a) a coalescing agent to provide a desired amount of flexibility and elongation to a film resulting from the evaporation of the solvent of the composition, and
   b) a surfactant present in an amount to reduce foaming,
   c) a plasticizer present in an amount to obtain a desired degree of softness,
   d) a non-ionic neutral wetting agent to provide an emulsification to the composition,
   e) a non-metallic hydrated thickening agent to provide a desired viscosity to the composition.

12. The water-based lacquer composition of claim 11 further characterized in that polymer dispersion is selected from the class consisting of acrylates, polyurethanes, and non-vulcanizable latex resins, and the coalescing agent is an ester alcohol, hydrated non-metallic finely dispersed thickening agent is a silicon base.

13. A water-based transparent or translucent, relatively permanent film-forming lacquer composition for application to unfinished plastic items with good adhesion and which is environmentally safe and presents little or no health risks, and which items have been formed in plastic forming operations and have not had any permanent surface treatment finish thereon, said lacquer composition comprising:
   a) a fully reacted aqueous film-forming polymer dispersion in which the polymer of the dispersion dries on the plastic items by evaporation of a carrier as opposed to polymerization, and polymer being present in the composition in an amount of about 1% to 35% by weight based on the total weight of the composition,
   b) a water-miscible solvent selected from the class consisting of amides and ketones and pyrrolidones in an amount sufficient to dissolve a surface portion of the plastic item without creating any chemical reaction with the plastic item and thereby cause a physical bonding of the polymer dispersion and the plastic item to thereby enable good adhesion of the polymer dispersion to the plastic item, the amount sufficient being an amount no greater than 30% by weight based on the total weight of the lacquer composition, said solvent also being present in an amount of about 10% to 30% by weight based on the total weight of the composition,
   c) water present in the composition in an amount of at least 35% by weight based on the total weight of the composition, and
   d) pigment or dye incorporated in said lacquer composition which provides a permanent color to the composition but where the composition can remain transparent or translucent, said pigment or dye being present in the lacquer composition in an amount of about 0.2% to about 2% by weight based on the total weight of the composition, and where the composition, when hardened forms a film on the plastic item with adhesion substantially as good as the adhesion obtained with a lacquer composition having substantially an organic solvent as the solvent for the dispersion and pigment or dye, so that the color imparted to the plastic item is permanent.

14. The water based lacquer composition of claim 13 further characterized in that the composition comprises a coalescing agent present in an amount of about 2% to about 15% based on the total weight of the composition to provide a desired amount of flexibility and elongation to a film resulting from the evaporation of the solvent carrier of the composition.

15. The water based lacquer composition of claim 13 further characterized in that the composition comprises a surfactant present in an amount of about 0.5% to about 1% to reduce foaming.

16. The water based lacquer composition of claim 13 further characterized in that the solvent is present in an amount of about 5% to about 20% by weight based on the weight of the composition to obtain a desired degree of softness.

17. The water based lacquer composition of claim 13 further characterized in that the composition comprises a non-ionic neutral wetting agent of not more than 2% by weight based on the total weight of the composition to provide an emulsification to the composition.

18. The water based lacquer composition of claim 13 further characterized in that the composition comprises a non-metallic hydrated thickening agent present in an amount of about 0.2% to 15% by weight based on the total weight of the composition.

19. A method of binding a pigment or dye to an unfinished plastic item with good adhesion to provide scratch and abrasive resistance and provide an aesthetic quality thereto and which is environmentally safe and presents little or no health risks, and which items have been formed in plastic forming operations and which have not had any permanent surface treatment finish thereon, said method comprising applying a water-based transparent or translucent, relatively permanent film-forming lacquer composition comprised of:

a) a fully reacted aqueous film-forming polymer dispersion in which the polymer of the dispersion dries on the plastic items by evaporation of carrier as opposed to polymerization, b) a water-miscible solvent selected from the class consisting of amides and ketones and pyrrolidones in an amount sufficient to dissolve a surface portion of the polyurethane plastic item without creating any chemical reaction with the plastic item and thereby cause a physical bonding of the polymer dispersion and the plastic item to thereby enable good adhesion of the polymer dispersion to the plastic item, said solvent being present in an amount no greater than 30% by weight based on the total weight of the lacquer composition, c) water-present in an amount of at least 35%, by weight, based on the total weight of the composition, and d) a pigment or dye incorporated in said lacquer composition which provides a permanent color to the composition but where the composition can remain transparent or translucent and which lacquer composition provides good adherence to a plastic item with good scratch and abrasion adherence and provides an aesthetic quality to the plastic item, and where the composition, when hardened forms a film on the plastic item with adhesion substantially as good as the adhesion obtained with a lacquer composition having substantially an organic solvent as the solvent for the dispersion and pigment or dye, so that the color imparted to the plastic item is permanent.

20. The method of claim 1 further characterized in that the method comprises applying a lacquer composition also comprised of a coalescing agent to provide a desired amount of flexibility and elongation to a film resulting from the evaporation of the solvent of the composition.

21. A water-based transparent or translucent, relatively permanent film-forming lacquer composition for application to unfinished polyurethane plastic items with good adhesion and which is environmentally safe and presents little or no health risks, and which items have been formed in plastic forming operations and which have not had any surface treatment finish, said lacquer composition comprising:

a) a fully reacted aqueous film-forming polyurethane containing polymer dispersion in which the polymer of the dispersion dries on a polyurethane item by evaporation of a carrier as opposed to polymerization, b) a water-miscible pyrrolidone solvent in an amount sufficient to dissolve a surface portion of the polyurethane plastic item and cause a physical bonding with the polymer dispersion to the plastic item without creating any chemical reaction with the plastic item to thereby enable good adhesion of the polymer to a plastic item, said solvent being present in an amount no greater than 30% by weight based on the total weight of the lacquer composition, c) water-present in an amount of at least 30% by weight based in the total weight of the composition, and d) a pigment or dye incorporated in said lacquer composition which provides a permanent color to the composition but where the composition can remain transparent or translucent, and which lacquer compensation provides good adherence to a plastic item with good scratch and abrasive adherence and provides an aesthetic quality to the plastic item, and where the composition, when hardened forms a film on the plastic item with an adhesion substantially as good as the adhesion obtained with a lacquer composition having substantially an organic solvent as the solvent for the dispersion and pigment or dye, so that the color imparted to the plastic item is permanent.

22. The water-based lacquer composition of claim 21 further characterized in that the composition comprises:

a) a coalescing agent to provide a desired amount of flexibility and elongation to a film resulting from the evaporation of the solvent of the composition, b) a surfactant present in an amount to reduce foaming, c) a plasticizer present in an amount to obtain a desired degree of softness, d) a non-ionic neutral wetting agent to provide an emulsification to the composition, and e) a non-metallic hydrated thickening agent to provide a desired viscosity to the composition.

23. The water-based lacquer composition of claim 21 further characterized that the solvent is N-methyl-pyrrolidone.

24. The water-based lacquer composition of claim 21 further characterized that the solvent is dimethyl formamide.

* * * * *